US010823844B2

United States Patent
Arndt et al.

(10) Patent No.: US 10,823,844 B2
(45) Date of Patent: Nov. 3, 2020

(54) METHOD AND APPARATUS FOR ANALYSIS OF A VEHICLE ENVIRONMENT, AND VEHICLE EQUIPPED WITH SUCH A DEVICE

(71) Applicant: FORD GLOBAL TECHNOLOGIES, LLC, Dearborn, MI (US)

(72) Inventors: Christoph Arndt, Rheinland-Pfalz (DE); Uwe Gussen, Huertgenwald (DE); Frederic Stefan, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 330 days.

(21) Appl. No.: 15/951,410

(22) Filed: Apr. 12, 2018

(65) Prior Publication Data
US 2018/0299545 A1  Oct. 18, 2018

(30) Foreign Application Priority Data

Apr. 12, 2017  (DE) .......... 10 2017 206 314

(51) Int. Cl.
*G01S 13/90* (2006.01)
*G01S 13/87* (2006.01)
(Continued)

(52) U.S. Cl.
CPC ...... *G01S 13/9023* (2013.01); *G01S 13/4454* (2013.01); *G01S 13/867* (2013.01);
(Continued)

(58) Field of Classification Search
CPC .................................................. G01S 13/931
See application file for complete search history.

(56) References Cited

U.S. PATENT DOCUMENTS

| 4,150,375 A | * | 4/1979 | Ross | G01S 13/106 342/21 |
| 5,657,027 A | * | 8/1997 | Guymon, II | G01S 3/023 342/442 |

(Continued)

FOREIGN PATENT DOCUMENTS

| DE | 102013203574 A1 | 9/2014 |
| DE | 102015001386 A1 | 8/2016 |
| WO | 2009138942 A2 | 11/2009 |

OTHER PUBLICATIONS

Rieken, Jens, et. al., "Toward-Perception Driven Urban Environment Modeling for Automated Road Vehicles," Institute of Control Engineering, Technische Universitaet Branschweig, published Jun. 26, 2015, Braunschweig, Germany, pp. 1-8.
(Continued)

*Primary Examiner* — Peter M Bythrow
(74) *Attorney, Agent, or Firm* — Frank Lollo; Brooks Kushman P.C.

(57) ABSTRACT

A method to analyze of a vehicle's surroundings is specified. The method includes: arranging a first sensor group with at least two radar sensors on a vehicle, emitting radar waves using the radar sensors into the vehicle environment, reflecting the emitted radar waves at objects in the vehicle's environment, receiving the reflected radar waves using the radar sensors, identifying information about the vehicle's environment from the received radar waves and outputting the radar information. In order to improve the analysis of the carriageway environment, the radar sensors are arranged on the vehicle such that the emitted and received radar waves interfere. Radar information is obtained by taking account of the resulting interference data. In addition, a vehicle apparatus to analyze a vehicle's surroundings.

17 Claims, 2 Drawing Sheets

(51) Int. Cl.
  *G01S 13/44* (2006.01)
  *G01S 13/86* (2006.01)
  *G01S 13/931* (2020.01)

(52) U.S. Cl.
  CPC .......... *G01S 13/878* (2013.01); *G01S 13/931* (2013.01); *G01S 2013/93271* (2020.01); *G01S 2013/93272* (2020.01); *G01S 2013/93274* (2020.01)

(56) References Cited

U.S. PATENT DOCUMENTS

| | | | |
|---|---|---|---|
| 5,929,802 A * | 7/1999 | Russell | G01S 13/931 342/70 |
| 6,011,507 A * | 1/2000 | Curran | G01S 13/34 342/70 |
| 7,444,210 B2 | 10/2008 | Breed et al. | |
| 8,699,754 B2 | 4/2014 | Zhang et al. | |
| 8,775,063 B2 | 7/2014 | Zeng | |
| 9,014,903 B1 * | 4/2015 | Zhu | G01S 13/931 701/28 |
| 9,211,811 B2 | 12/2015 | Breed | |
| 9,245,448 B2 | 1/2016 | Schofield | |
| 9,269,268 B2 | 2/2016 | Bowers et al. | |
| 9,418,302 B2 | 8/2016 | Minemura et al. | |
| 9,575,160 B1 * | 2/2017 | Davis | G01S 7/352 |
| 10,571,562 B2 * | 2/2020 | Wodrich | G01S 13/931 |
| 2005/0156780 A1 * | 7/2005 | Bonthron | G01S 13/931 342/107 |
| 2006/0220912 A1 | 10/2006 | Heenan et al. | |
| 2006/0262007 A1 * | 11/2006 | Bonthron | G01S 13/44 342/70 |
| 2007/0164852 A1 | 7/2007 | Litkouhi | |
| 2008/0088499 A1 * | 4/2008 | Bonthron | G01S 13/931 342/104 |
| 2009/0192686 A1 | 7/2009 | Niehsen et al. | |
| 2014/0333472 A1 | 11/2014 | Nagy | |
| 2015/0241226 A1 | 8/2015 | Engelman et al. | |
| 2015/0338514 A1 * | 11/2015 | Sato | G01S 13/04 342/27 |
| 2016/0084941 A1 * | 3/2016 | Arage | G01S 13/584 342/91 |
| 2016/0132705 A1 | 5/2016 | Kovarik et al. | |
| 2016/0167582 A1 | 6/2016 | Chen et al. | |
| 2017/0276788 A1 * | 9/2017 | Wodrich | G01S 13/931 |
| 2017/0328729 A1 * | 11/2017 | Zhu | G01S 13/58 |
| 2018/0038694 A1 * | 2/2018 | Bruemmer | G01S 13/0209 |
| 2018/0149742 A1 * | 5/2018 | Izadian | H01Q 1/1264 |
| 2018/0267160 A1 * | 9/2018 | Slemp | G01S 13/931 |

OTHER PUBLICATIONS

Költzsch, Tobias, "Radar Should Avoid Loss of Orientation of Autonomous Cars," golem.de, Jul. 2, 2016, pp. 1-3.

* cited by examiner

METHOD AND APPARATUS FOR ANALYSIS OF A VEHICLE ENVIRONMENT, AND VEHICLE EQUIPPED WITH SUCH A DEVICE

CROSS-REFERENCE TO RELATED APPLICATIONS

This application claims foreign priority benefits under 35 U.S.C. § 119(a)-(d) to Application DE 10 2017 206 314.9 filed Apr. 12, 2017, which is hereby incorporated by reference in its entirety.

TECHNICAL FIELD

The disclosure relates to a method and an apparatus for analysis of a vehicle's environment equipped on a vehicle.

BACKGROUND

Nowadays, sensors are becoming ever more important due to the wealth of information that can be obtained with them. Even in the automotive industry, which is currently focused on the area of autonomous driving, sensor technology is also gaining in importance, because it allows analysis of an environment and thus can contribute to improved ability to control vehicles as well as increased safety and improved ride comfort.

A major cause of accidents that do not involve other vehicles is the vehicle unintentionally coming off the road, so that it is this particular respect in which driving safety ought to be improved.

Analysis of a carriageway is currently, primarily based solely on information determined by camera sensors. This method does not guarantee redundancy, and there is a risk of incorrect or incomplete information. In addition, camera sensors require good visibility conditions to be able to deliver meaningful information.

SUMMARY

The object of the disclosure, therefore, is to improve analysis of a vehicle environment.

The disclosure is based on using radar sensors to analyze of a carriageway, for example a road, an edge of the carriageway, road markings or a condition of the carriageway, for example, monitoring a quality of the carriageway.

A carriageway according to the disclosure is understood to mean any structure that is suitable for traversal by non-rail-bound, land-based vehicles, for example, roads, freeways, bike paths.

Radar is the term used to designate a variety of detection and location methods and equipment that are based on the use of electromagnetic waves in the radio frequency range (radio waves). Accordingly, radar sensors are technical components that determine properties, such as a distance to an object or its surface structure, on the basis of an interaction with radio waves, by emitting radar waves and receiving them again.

Radar enables, for example, an accurate distance measurement on the basis of a propagation-time method, or time-of-flight (TOF), wherein a time taken by a signal, i.e. an emitted radar wave, to traverse a measuring path is measured. To determine a distance to an object, a time that elapses between emission of the radar wave and reception of the radar wave reflected by an object is measured. This technique can also be used to determine a structure of surfaces.

Equipping a vehicle with a plurality of radar sensors enables interference of the radar waves to take place, so that by using an interference pattern, more accurate information about surface structures can be derived and surfaces can be precisely analyzed and, if necessary, can be categorized.

For example, radar sensors on the vehicle that are oriented forwards, backwards or to a side can be combined with one another, so that by using resulting interference patterns a surface of a vehicle environment can be analyzed. Accuracy can be further improved by a beam of an emitted radar radiation being specially shaped, or being switched between different frequency bands.

This makes it possible, for example, to detect a boundary of the carriageway on the basis of surface differences between the carriageway and an area adjacent to an edge of the carriageway (carriageway verge). Even in the event that these involve similar materials, the disclosure enables a clear distinction to be made, at least in the case where a separation due to a curb or pavement exists.

In addition, structures on the carriageway surface itself can be detected, such as road markings that demarcate individual traffic lanes and arrows that indicate a direction of travel. Such carriageway markings are applied to the carriageway and thereby change a surface and reflection coefficient for the radar wave. Thus, markers on the carriageway surface can be identified on the basis of different surface structures and reflection coefficients.

In particular, so-called rumble strips, or road markings that, when driven over with a vehicle tire, transmit vibrations and noise to a vehicle driver, can be easily detected because an associated rough surface promotes detection by radar.

Information about the carriageway, for example a carriageway composition, can also be forwarded to a central unit that collects these data, for example, for use by public authorities. For example, a road quality map can be generated, which can be used inter alia for decisions regarding any necessary repair work on the carriageways.

It is also possible to merge information from a plurality of radar sensor groups. For example, information from radar sensors mounted on a front of the vehicle can be used to detect a carriageway boundary and road markings, while radar sensor groups arranged on a rear of the vehicle and/or on the sides can be used to verify this information. This also allows detection of concrete barriers that are often used to separate the individual traffic lanes for different directions of travel on a multi-lane freeway.

For example, in some cases a camera sensor is not able to distinguish between concrete or another lane, which might be arranged, for example, to a left of a left-hand lane.

Such problems can be avoided by combining radar information from a plurality of sensors, and using radar sensors whose radar waves overlap, so that interference is observed and a beam of emitted radar radiation is specially shaped as required, for example focused. An arrangement of a plurality of radar sensors connected together in the form of a sensor array can be used to control a shape and orientation of an antenna lobe, which results from the sensor array. This can enable a more selective targeting, an improvement in an aperture and an adjustment/orientation of the antenna lobe (principal maximum) on to specific areas, for example areas of the roadway, such as rumble strips.

The formation and control of an antenna cone of emitted radar radiation can be used to analyze a specific traffic lane of a roadway, a road boundary or other important characteristics of an environment for movement of the vehicle. For example, a subspace algorithm can be used to perform a transformation from sensor space to feature space, so that an optimal analysis of the vehicle environment is possible. Special signal characteristics (for example frequency ranges for chirps, etc.) can be used to focus radar waves on to specific structures, such as those patterns that are used to produce white road markings on the According to the disclosure, a vehicle has an apparatus that analyzes an environment of the vehicle. It is provided that radar sensors are or become arranged on the vehicle in such a way that radar waves to be emitted and/or received interfere such that radar information is determined from resulting interference data.

Thus, the disclosure uses the technique of interferometry, i.e. a measurement method that uses a comparison of relative phase changes between two or more optical beams, thus in this case radar radiation, to measure small changes of angles, distances and refractive indices on the basis of an interference pattern.

In conventional imaging radar systems, each point of a mapped area is assigned a position in an image plane according to its distance from a sensor. An intensity of a backscattered radiation characterizes materials of a surface, their roughness, orientation etc.

In radar interferometry, a test area (terrain) is imaged from two or more different sensor positions. Because radar systems are coherent systems, in addition to information on the backscatter intensity the data also contain phase information of the coherent wave at the time of the reflection.

Each pixel in a radar image carries these two types of information. The intensity characterizes the materials of the surface, their roughness, orientation etc., so that a pictorial reproduction of the terrain can be generated. In the intensity, two effects are superimposed that cannot be clearly separated from each other. These are firstly reflectance of a reflective surface and secondly, an attenuation due to the distance (depending on time of flight and medium). This limits a distance resolution and severely restricts surface analysis.

These restrictions in surface analysis can be overcome by application of interferometry, which analyzes phase. The technique of interferometry facilitates a surface analysis with more accurate, i.e. finer resolution, so that differences between a road surface and rumble strips, and a carriageway edge can be detected. Using a pure distance measurement without application of interferometry would only be possible with a significantly poorer quality in terms of resolution and accuracy.

On the other hand, phase information is used in a completely different way. If the radar system images similar terrain again from an almost identical position, for example by using first and second radar sensors of a first sensor group, phase images are not identical. Differences between phase images depend on distances of objects. Therefore, by combination of phase images of suitable multiple recordings, distance differences can be calculated, from which, for example, a digital terrain model can be obtained.

For the purposes of the present disclosure, a vehicle is understood to mean any mobile means of transport, in particular a land vehicle, such as a passenger car. The vehicle can be designed as an autonomous vehicle. An autonomous vehicle is understood to mean a self-propelling vehicle that can execute all safety-critical functions for an entire driving process such that no control by a vehicle driver is required at any time. The vehicle controls all functions from start to stop, including all parking functions. In addition, a manual mode can also be provided, in which a human driver controls all or some vehicle functions.

The first sensor group 1 can be arranged, for example, on a front of the vehicle, at a rear of the vehicle, on sides or elsewhere, provided an interference of radar waves to be sent and/or received is enabled.

As already stated above, radar waves are radio waves. Included in this are surface-penetrating and ground-penetrating radar waves, where an interaction can occur with an object to be analyzed underneath a surface, for example, below the earth's surface.

Emitted radar waves are reflected from objects in a vehicle environment. Objects of this kind can be, for example, a carriageway (not shown), an edge of the carriageway, i.e. an area immediately adjacent to the carriageway (not shown), demarcation devices that mark the edge of the carriageway, road markings, or even objects 6 underneath the carriageway surface.

The reflected radar waves are received by the sensors again. Then, information can be obtained about the vehicle environment through the reflected and received radar waves, and from interference data resulting from interference of radar waves by determining a distance of objects in the vehicle environment, for example, through a time-of-flight measurement and interferometry, and/or by detecting a surface structure of an object in the vehicle's environment as radar information.

Using a comparison of received radar information with previously stored data on a processing unit, it is possible, for example, to identify the object. For example, it is possible to determine whether the surface of the carriageway is asphalted or paved, whether the edge of the carriageway is attached and if so, what demarcation devices are present.

Subsequently, the radar information is output. The information can be output directly to a vehicle user, such as the vehicle driver, for example visually via a display or acoustically by speech output.

Another possibility is that the information is output, for example, to an output processing unit and processed there. Thus, the radar information can be taken into account, for example, in autonomous guidance of the vehicle, or instructions can be issued to a driver, for example, as a warning message, indicating a potential departure from the carriageway while maintaining a direction of travel.

The method according to the disclosure can also be used particularly advantageously in poor visibility conditions, or in an event that the objects in the vehicle environment are covered with extraneous material (snow, ice, sand, etc.), because in contrast to use of camera sensors, no visual contact with the objects is necessary for determining the radar information. Thus, for example, a potential departure from the carriageway can be predicted in a timely manner in poor visibility conditions. This contributes to improved driving safety.

In accordance with different design variants, the emitted radar waves can be reflected from a carriageway and/or a carriageway edge, and radar information relating to the carriageway and/or the carriageway edge can be determined.

This offers the possibility of identifying an area in which the vehicle can be safely driven. If there is an imminent risk of exiting this safe region, a visual or audible warning signal can be emitted via the output processing unit.

In addition, a condition of the carriageway can be characterized. If, for example, many uneven areas or holes are present, a warning signal or warning information can also be issued via the output processing unit or in case of an autonomous vehicle, the vehicle can be slowed down by braking initiated via the output processing unit. This also contributes to increased driving safety and to prevention of accidents.

For example, in relation to the vehicle navigation, carriageway markings can also be detected via demarcation devices. If it is established, for example, that there are road markings, for example arrows, on the carriageway, this can be output as radar information to the vehicle driver or a processing unit, so that a lane change can be performed on the carriageway if necessary.

In addition, the radar information can also be used to determine a position of the vehicle. To do so, the radar information, for example radar information based on surface-penetrating radar waves, can be compared with previously recorded radar information. Based on the information specific to each point or a characteristic information profile, an accurate determination of a location is possible, and therefore very accurate navigation.

In accordance with other design variants, it can be provided that the radar information is taken into account in the vehicle guidance, for example in the case of autonomous driving. To do so, the radar information can be transferred to a processing unit, for example, which is also designed for vehicle guidance, i.e. autonomously control the vehicle. The radar information can be used, for example, to determine a driving trajectory of the vehicle, i.e. a specific course of movement of the vehicle with respect to the environment, in order to ensure that the vehicle is in a safe region at all times, i.e., for example, it does not exit the carriageway.

In addition, depending on the condition of the carriageway, a speed adjustment can also be made by the output processing unit.

The use of the radar information thus enables an autonomous vehicle to be driven with improved safety, since more accurate information about the vehicle environment can be collected and taken into account.

In accordance with other design variants, it can be provided that information on the vehicle environment is determined and output by one or a plurality of camera sensors. In this design variant, the first sensor group is a radar sensor system and the second sensor group is a camera sensor system. Such information will be designated hereafter as camera information.

The use of two sensor systems, namely radar and camera sensors, enables at least a partial redundancy and, on the other hand, means that strengths of both systems can be combined with each other. For example, the radar sensor system is able to analyze the vehicle's environment, even in difficult visibility conditions, for example snow, fog or heavy rain, while the camera sensor system allows a photographic image of the vehicle environment to be obtained so that the information directly obtained is easier for the driver to understand.

The use of radar and camera information can be used, for example, for the analysis or tracking of road markings or the analysis or tracking of the edge of the road.

The redundancy of the two sensor systems, i.e., the fact that the analysis of the vehicle environment is performed by the sensor systems independently, means that an adequate analysis of the vehicle environment can be guaranteed even in an event of a failure of one of the sensor systems. This is particularly important in the case of an autonomously driven vehicle, because without an analysis of the vehicle environment using sensors the vehicle would have to be stopped.

For example, the radar information and the camera information can be merged (fused), which can improve, for example, the analysis of the carriageway edge, the edge strips, etc. In other words, the information from both sensor systems can be combined with each other, resulting in improved output information, for example a more precise position, angle etc. Methods of data fusion can be used to merge the sets of information.

This allows the disadvantages of the radar sensor system in lateral resolution and the disadvantages of the camera sensor system in longitudinal resolution to be reduced or even eliminated. Due to the time-of-flight method, the measurement of a distance from an object (longitudinal resolution) by the radar sensor system is very accurate, while the lateral resolution however, i.e. the determination of the transverse position of an object, is comparatively low due to the limited angular resolution of the radar.

On the other hand, the camera sensor system can determine a transverse position of an object more accurately. However, due to the limited pixel resolution of the image such an accurate longitudinal resolution, i.e. determination of the distance from the object, cannot be achieved. By fusing the radar and camera information, both a determination of the longitudinal and the transverse positioning, i.e. the longitudinal and transverse resolution, of the object can be improved, allowing even better results than can be achieved by exclusive use of the best sensor of each type.

In addition, fusing the sensor system allows the possibility of comparing the merged information from the radar sensor system and the camera sensor system against each other for verification, wherein only verified information is output. This provides some degree of protection against false information, since only verified information is output and subsequently used. If a certain item of information cannot be verified, a signal can be output that indicates this fact, and, for example, instructs the vehicle driver to perform a separate analysis of the vehicle environment.

In accordance with other design variants, radar information of at least one additional sensor group with at least two radar sensors can be determined. In this case, with regard to a maximally detailed analysis of the vehicle environment, it is also advantageous if the radar sensors of the other sensor groups are also arranged on the vehicle in such a way that radar waves to be sent and/or received interfere. The radar information of the additional sensor groups can be determined by taking into account the resulting interference data.

The radar information from the first and the additional sensor groups can be merged (fused), for example by applying data fusion methods.

For example, radar information of a first sensor group on the front of the vehicle can be used for the analysis of the edge of the carriageway or the road markings. The relevant radar information received can be compared and verified with radar information from another sensor group located on a tailgate of the vehicle or on a side of the vehicle. This may enable a detection of concrete barriers, for example, which are used for separating two directions of travel, such as on a freeway. Also, positioning and orientation of the vehicle with respect to the carriageway edge or to the traffic lane can be observed.

Here also, the possibility exists of comparing the radar information from a plurality of radar sensor group with each other for verification and only outputting, via the processing unit, verified information.

As described previously in terms of a fusion of radar and camera information, a certain level of protection against false information may be obtained here also, since only verified information is output via the processing unit and subsequently used.

In accordance with other design variants, the determined radar information can be transferred to an external processing and storage unit and used to generate a map of the carriageway condition. Such a map can contain, for example, information about the condition of the carriageway surface, the carriageway edge or the carriageway markings. For example, it can be identified and recorded in the external processing unit generated on the carriageway condition map if there is a large difference in height between the carriageway itself and the carriageway edge, since such a difference in height tends to favor a vehicle coming off the carriageway. The carriageway condition map that is generated by the external processing unit can be used, for example, as information on or the planning of maintenance and repair work.

In accordance with further design variants, the radar waves can have characteristics tailored to an interaction with the vehicle environment, for example a special signal structure. For example, it is possible to provide specially-designed chirps with a specific frequency range for the radar waves.

As a result, the location, focusing or tracking of structures, in particular on the carriageway or the carriageway edge can be improved, i.e. a higher accuracy of the radar information can be obtained.

An apparatus according to the disclosure is further described. The apparatus has a first sensor group having at least two radar sensors to emit and receive radar waves, a processing unit that determines information about the vehicle's environment from the radar waves, hereafter designated as radar information, and an output unit to output the radar information, for example a display, or else a transmission device to output in the sense of transmission.

According to the disclosure, it is provided that the radar sensors are arranged on the vehicle in such a way that the radar waves to be emitted and/or received interfere.

The apparatus according to the disclosure is suitable, for example, to execute a method according to the disclosure. For this reason, the above comments describing the disclosure also serve to describe the apparatus according to the disclosure.

In accordance with different design variants, the processing unit can also be designed to drive the vehicle by taking account of the radar information, i.e., the processing unit can be used for autonomously driving a vehicle, taking into account the radar information.

According to other design variants, the apparatus can additionally comprise one or a plurality of camera sensors that determine information about the vehicle environment, hereafter designated as camera information. In doing so, the processing unit can also be designed to merge, i.e. performing a data fusion of the radar information and the camera information. According to other design variants, the apparatus can also have at least one further sensor group with at least two radar sensors, wherein the processing unit can also be designed to merge, i.e. performing a data fusion of, the radar information of the first and each additional sensor group.

In accordance with other design variants, the apparatus can also be designed to compare the merged information, i.e. the radar information and the camera information and/or the radar information of the first and any other sensor group. This can enable, as explained above, a verification of the information obtained.

In accordance with other design variants, the apparatus can have a data transmission device to send the determined radar information to an external processing and storage unit. This can enable, for example, a map of the carriageway condition to be generated.

A vehicle according to the disclosure has one of the previously described embodiments of the apparatus. In particular, the vehicle can be designed as an autonomous vehicle.

The advantages of the apparatus are the same as those of the method according to the disclosure and its corresponding design variants.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

The disclosure will be explained in further detail hereafter by reference to an exemplary embodiment. It is understood that other embodiments can be used and structural or logical changes can be made without departing from the scope of protection of the present disclosure. The following detailed description is therefore not to be understood in a restrictive sense, and the scope of protection of the present disclosure is defined by the attached claims. Numerals for similar components across design variants have been kept the same.

Figure 1:
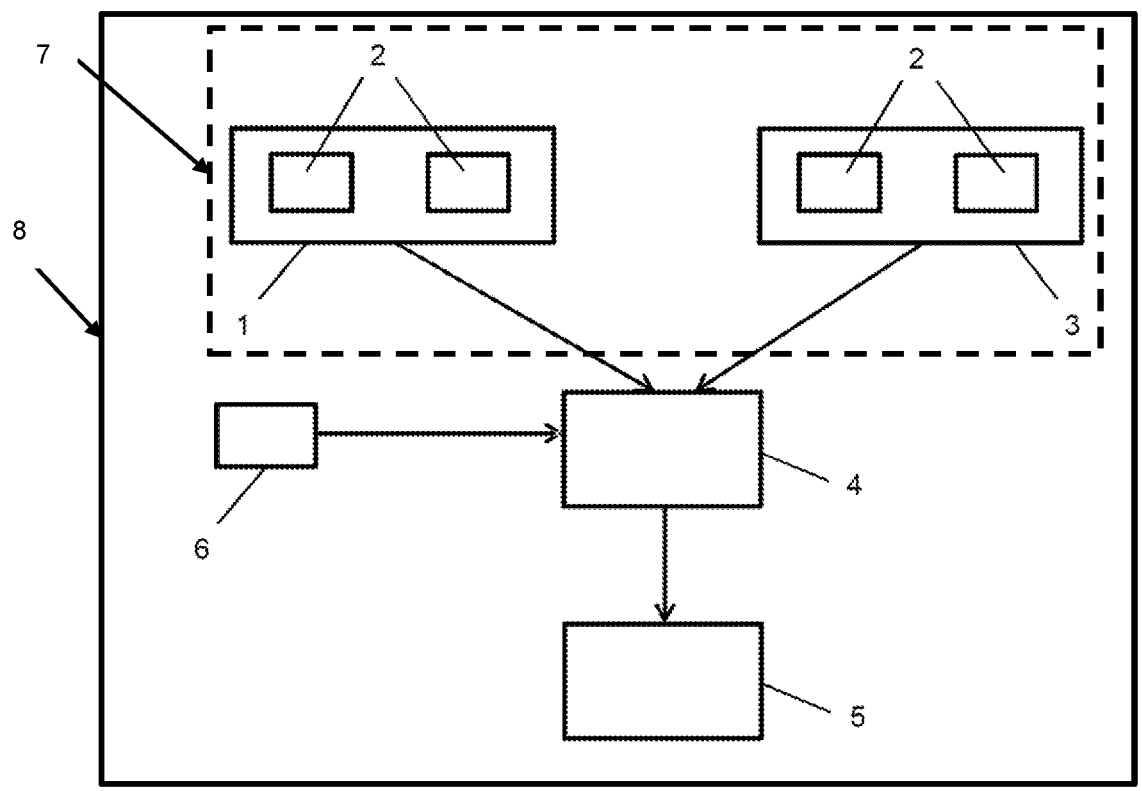
FIG. 1 depicts a schematic illustration of a vehicle system according the present disclosure.

In accordance with an exemplary embodiment depicted in FIG. 1, an autonomous vehicle 8 has an apparatus 7 that analyzes the vehicle environment. This apparatus 7 comprises a first sensor group 1, which is arranged on a front of the vehicle 8, and two radar sensors 2 that emit and receive radar waves. The two radar sensors 2 are arranged in such a way that the radar waves to be emitted and/or received can interfere.

In addition, a further sensor group 3 is provided at a rear of the vehicle, which also has two radar sensors 2 that emit and receive radar waves. These are also arranged in such a way that the radar waves to be emitted and/or received of the radar sensors 2 of the other sensor group 1 can interfere.

In addition, the apparatus 7 is provided with a processing unit 4 that determines information about the vehicle's environment from the radar waves and with an output unit 5 that outputs the radar information.

Using the radar sensors 2, radar waves are emitted to the vehicle environment, in the exemplary embodiment, to the edge of the carriageway. These radar waves are reflected by the carriageway edge and received again by the radar sensors 2. From the received radar waves, information is determined about the carriageway edge on the basis of the resulting interference data. For example, it is possible to determine what type of surface structure the carriageway edge has and whether there is a height difference between the edge of the carriageway and the carriageway.

The information obtained are taken into account in the autonomous vehicle guidance, for example, by reducing a speed of the vehicle 8 or specifying a maximum speed if the condition of the carriageway verge is poor, for example, if potholes are present.

The information obtained by the radar sensors 2 of the additional sensor group 3 is combined with the radar information from the first sensor group 1 and compared, so that the radar information can be verified. Only in the event of an agreement between the radar information of the first and the other sensor group 1, 3 are the radar information taken into account in driving the autonomous vehicle 8.

Optionally, camera sensors can also be present, wherein information based on these sensors can also be used for verification.

The possibility also exists that the radar information determined can be transferred to an external processing and storage unit and used to generate a map of the carriageway condition.

Figure 2:
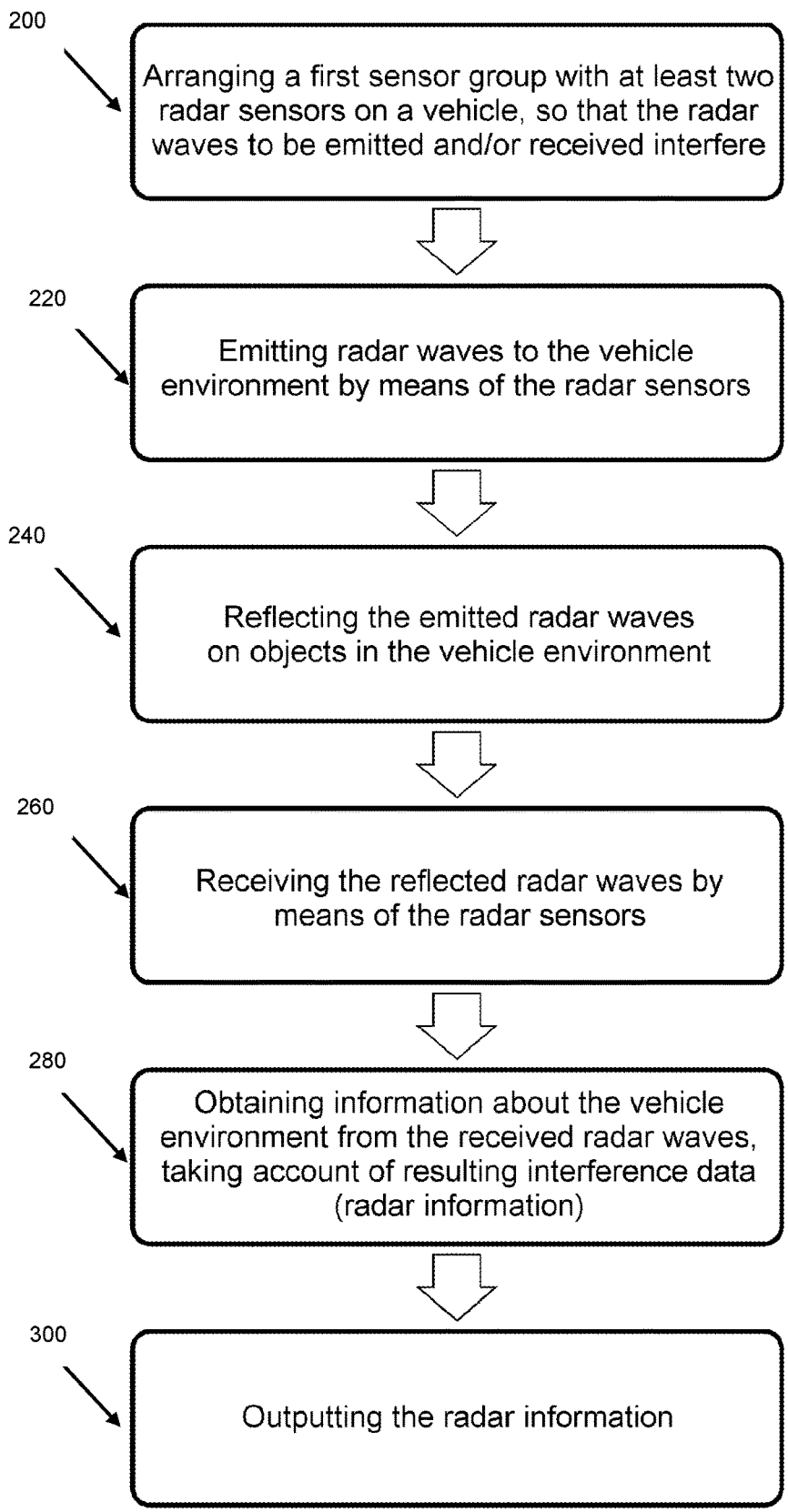
FIG. 2 depicts a flow chart depicting steps of a method according the present disclosure.

FIG. 2 depicts the method according to the disclosure to analyze a vehicle environment. The method includes arranging a first sensor group with at least two radar sensors on a vehicle at 200. Next, the method includes emitting radar waves by means of the radar sensors into the vehicle environment at 220. At 240 and 260, the method includes reflecting the emitted radar waves at objects in the vehicle's environment and receiving the reflected radar waves through the radar sensors from the vehicle's environment. Then, at 280, the method includes identifying information about the vehicle's environment from the received radar waves, hereafter referred to as radar information. Lastly, the method includes outputting the radar information at 300.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method to analyze a vehicle environment, comprising:
    arranging a first sensor group, having at least two radar sensors, on a vehicle such that emitted and received radar waves interfere;
    emitting radar waves to a vehicle environment via the radar sensors;
    receiving reflected radar waves via the radar sensors to generate interference data indicative of the vehicle environment;
    detecting an object via the reflected radar waves and via one or more camera sensors;
    outputting radar information, determined by the interference data, about the vehicle environment from received radar waves;
    outputting a longitudinal position of the object relative to the vehicle based on the reflected radar waves; and
    outputting a transverse position of the object relative to the vehicle based on data from the one or more camera sensors.

2. The method as claimed in claim 1, wherein the emitted radar waves are reflected from a carriageway and provide radar information indicative of the carriageway.

3. The method as claimed in claim 1 further comprising merging additional radar information from at least one additional sensor group having at least two radar sensors with the radar information from the first sensor group.

4. The method as claimed in claim 3 further comprising comparing merged sets of radar information from the additional radar information and the radar information with each other for verification such that only verified information is output.

5. The method as claimed in claim 1 further comprising generating, with an external processing and storage unit, a map indicative of a carriageway condition from the radar information.

6. A vehicle apparatus to analyze an environment, comprising:
    a first sensor array having two radar sensors to emit and receive radar waves arranged such that the waves generate an interference pattern as radar information;
    a second sensor array having two camera sensors arranged to generate camera information;
    a processing unit configured to store environment information including the radar and camera information; and
    an output unit designed to output the environment information, a longitudinal position of a detected object relative to the vehicle based on the radar information, and a transverse position of the detected object relative to the vehicle based the camera information.

7. The vehicle apparatus as claimed in claim 6, wherein the processing unit is configured to control a vehicle driving system based on the environment information.

8. The vehicle apparatus as claimed in claim 6, wherein the processing unit is configured to merge the radar information and the camera information to generate the environment information.

9. The vehicle apparatus as claimed in claim 6 further comprising a third sensor array having two radar sensors that generate additional radar information, wherein the processing unit is configured to merge the radar information and the additional radar information as merged information.

10. The vehicle apparatus as claimed in claim 9, wherein the processing unit is configured to compare the merged information with the environment information for verification such that only verified information is output.

11. The vehicle apparatus as claimed in claim 6 further comprising a data transmission device configured to transmit the environment information to an external processing unit that generates a map indicative of a carriageway condition.

12. A vehicle comprising:
    a processing unit configured to,
        in response to radar information derived from an interference pattern of emitted and received radar waves from two radar sensors of a first sensor array being stored as environment information, output the environment information to a display; and
        in response to the radar information and camera information derived from at least two camera sensors, output a longitudinal position of a detected object relative to the vehicle based on the radar information and a transverse position of the detected object relative to the vehicle based the camera information to the display.

13. The vehicle as claimed in claim 12, wherein the processing unit is configured to merge the radar information and the camera information to generate the environment information.

14. The vehicle as claimed in claim 12 further comprising a second sensor array having two radar sensors that generate additional radar information, wherein the processing unit is configured to merge the radar information and the additional radar information as merged information.

15. The vehicle as claimed in claim 14, wherein the processing unit is configured to compare the merged information with the environment information for verification such that verified information is output.

16. The vehicle as claimed in claim 15 further comprising a data transmission device configured to transmit the verified information to an external processing unit that generates a map indicative of a carriageway condition.

17. The vehicle as claimed in claim 16, wherein the processing unit is configured to control over vehicle system based on the map.

* * * * *